Aug. 13, 1968 R. L. HALL 3,396,758

PROCESSING OF TRANSISTOR LEADS

Filed May 6, 1966 4 Sheets-Sheet 1

INVENTOR.
RAYMOND L. HALL
BY
Ralph R Roberts
AGENT

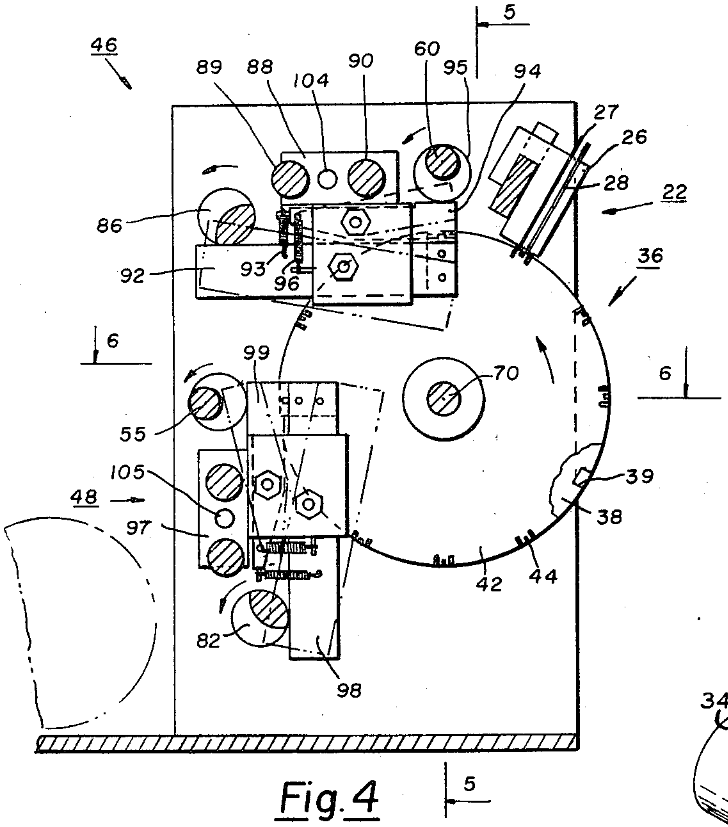
Fig. 4
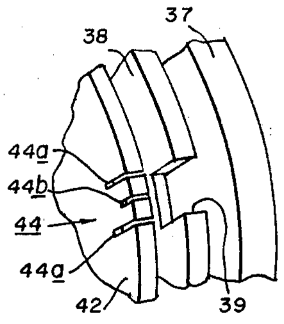
Fig. 4A
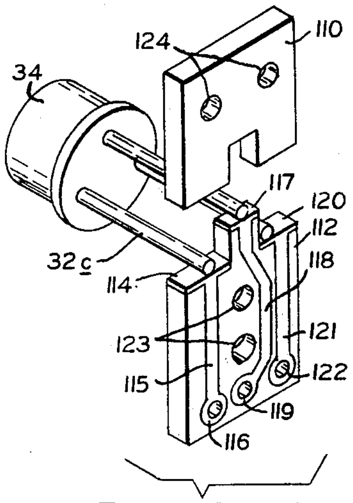
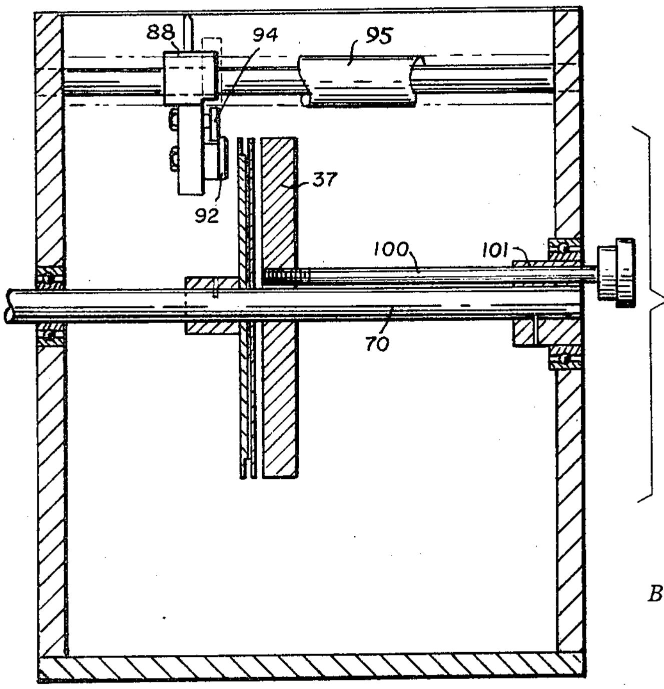
Fig. 5 Fig. 10
INVENTOR.
RAYMOND L. HALL
BY
Ralph R Roberts
AGENT INVENTOR.
RAYMOND L. HALL
BY
Ralph R. Roberts
AGENT Aug. 13, 1968 R. L. HALL 3,396,758

PROCESSING OF TRANSISTOR LEADS

Filed May 6, 1966 4 Sheets-Sheet 4

INVENTOR.

RAYMOND L. HALL

BY

Ralph R Roberts

AGENT

United States Patent Office 3,396,758
Patented Aug. 13, 1968

3,396,758

PROCESSING OF TRANSISTOR LEADS

Raymond L. Hall, Whippany, N.J., assignor to Martin G. Heller, West Orange, N.J.

Filed May 6, 1966, Ser. No. 548,317
24 Claims. (Cl. 140—1)

ABSTRACT OF THE DISCLOSURE

This invention relates to the apparatus and method of processing transistors having a plurality of wire leads or the like extending from one side of the base or body of the transistor.

The apparatus and method includes a feeding means in the form of a finger chute having guide fingers or slide plates precisely spaced and providing a guide between adjacent leads, whereby the transistor is oriented and is maintained in orientation as it is fed to a transport means. The transport means has a series of pockets each having a lead cover with formed wire receiving grooves of precise depth and relationship to the pocket. After the transistor has dropped into the pocket with each of the wire leads being retained in a groove, the transport means is advanced in a manner to first carry the transistor to a cutting station where the leads are cut to a precise determined length after which the cutting mechanism is opened and the transport means is advanced to a bending station where dies are moved to the leads to bend and/or space the leads to a desired shape. These bending dies are opened and the transport means is advanced to bring the pocket to a discharge position whereat the transistor is discharged to a storage or accumulating station. The above brief description of the invention pertains to apparatus and method wherein after being placed in a finger chute the transistor is automatically transported and the leads are automatically cut and shaped.

*Background of the invention*

The development and rapidly expanding and extensive use of the transistor in the past decade has brought mass-production techniques for the rapid production of them. The manufacturers of these types of electrical components customarily produce and supply them with long leads which are then cut and formed by the user for mounting in his particular electronic circuit. It is quite common to find in the same electronic circuit many of the same value transistors each with a different requirement for the length, shape and spacing of the lead wires. These requirements include forming an offset in the lead sufficient to provide a shoulder at a given point as the lead is mounted in a hole in a printed circuit board. In this manner the transistor may be suspended above the board so that it will not be subjected to all the vibrations of the board or to all the heat of soldering. At other times the leads are spread in a specified shape for such reasons as to reduce the possibility of short circuiting of the soldered points to the printed board. As the quality and quantity of applications of transistors to electronic circuits increase the greater is the need for the automatic cutting and forming device of this invention and for precisely cutting the leads to a determined length and to spread and bend the leads to a precise shape and location.

The widespread use of transistors in the multitude of electrical circuits such as radio, television, computers and like assemblies require that the transistors be made to fit economically in the various assembly processes. Among these processes are those using printed circuit systems in which boards and other mounting arrangements having wire receiving holes of precise location which are provided for the mounting therein of the lead wires of the transistors. In the design of these electrical circuits it is necessary that the lengths of the leads of the transistors be of a predetermined length, configuration and spacing so that all the components will fit and operate in the circuit in a determined manner. Much thought and consideration, building of apparatus and the like has been done to cut the leads to a determined length and then bend them so that they will fit into the mounting holes in a determined manner. The automatic cutting and bending of leads prior to this invention is not known.

The cutting of wire leads on transistors and the like is exemplified in U.S. Patents 2,571,078 to J. Vollmer on Oct. 9, 1951; 2,923,189 to F. J. Zoschg on Feb. 2, 1960; 3,071,166 to E. A. Gutbier on Jan. 1, 1963; 3,075,562 to A. S. Jankowski on Jan. 29, 1963; and 3,144,889 to T. H. Cole on Aug. 18, 1964. The apparatus and methods of the above inventions and other art patented or as used in the various assembly lines are directed toward straightening and/or cutting of the lead lengths. Apparatus for orienting, precisely feeding, precisely transporting to precise locations whereupon the leads can be precisely cut and subsequently bent to a precise shape and spacing is neither known nor suggested in any known art.

This invention relates to the apparatus and method of cutting and forming two or more leads extending from one end of a transistor or similar component.

Even more particularly this invention relates to the apparatus and method for receiving, orienting and precisely feeding a series of transistors having two or more leads, the leads being fed through guide fingers so that each transistor is precisely brought in the way of a transport means. As the transistor is fed into the transport means the leads are precisely oriented and in this oriented position the transistor is advanced to a precise cutting station where one die member is brought to a support position and a complementary die member is brought to and past the support die in a manner to cut the leads, after which the die members are then moved away from the leads. The transport means is now advanced to a bending station where one die member is brought to a lead supporting position and a complementary die member is brought to the leads and to a determined proximity with the support die so that the leads are engaged and bent between the dies, after which the dies are opened and the transistors are delivered from the apparatus.

*Objects*

It is therefore an object of this invention to provide apparatus and a method for receiving components such as electrical transistors and the like and having two or more leads extending from one side or base, and to precisely orient and automatically feed these components to apparatus for performing subsequent operations.

It is a further object of this invention to provide a transport means and method for receiving and advancing in a precisely oriented manner a succession of components characterized as having multiple leads extending from a common base and to bring these components in the way of means such as for cutting and bending the leads to a determined length and form.

It is a further object of this invention to provide the means and method for receiving and retaining the precisely oriented multiple leads while they are smoothly cut to a selected length.

It is a further object of this invention to provide the means and method for receiving the precisely oriented multiple leads and to provide a support for these leads while specific portions of the leads are bent to a determined form and position.

It is still a further object of this invention to provide the means and method for receiving and retaining the precisely oriented multiple leads as the transistor is electronically checked.

It is a still further object of this invention to provide the means and method for receiving the precisely oriented multiple leads and to provide a separate means and method for moving a support surface into a determined position prior to the operations of either cutting, bending of the leads or testing of the transistor.

The above objects, brief description and other of the many of the attendant advantages and features of the present invention will become better understood from the following detailed description and accompanying drawings which together describe a preferred embodiment of the invention and will be more particularly in the claims appended hereto.

*Description*

In the drawings, wherein like symbols refer to like or corresponding parts throughout the several views:

FIG. 4 represents a sectional side view of the transport, cutting and forming mechanism and taken generally on the line 4—4 of FIG. 1;

FIG. 4A represents a fragmentary isometric view showing in enlarger scale a portion of the transport wheel;

FIG. 5 represents a sectional view generally on the line 5—5 of FIG. 4 and with a portion of the cam shafts omitted and with the bending mechanism omitter;

Figure 1:
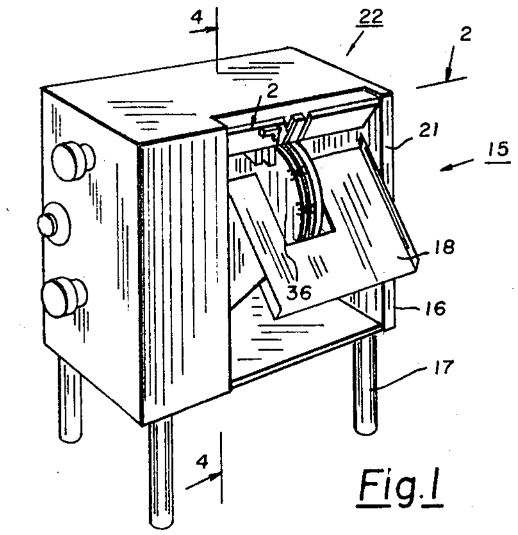
FIG. 1 represents an isometric view of the general arrangement of apparatus of this invention.

FIG. 10 represents an isometric view of the dies used for testing the transistor., Referring now in particular to the drawings and FIG. 1, the mechanism of this invention is preferably encased in a housing 15 having an outer case 16, legs 17 and a scrap chute 18. Mounted between side walls 20 and 21 is the feed or finger chute assembly 22 more completely shown in FIGS. 2 and 3. The feed or finger chute includes a support bar 24 extending between walls 20 and 21 and having a notched portion 25 formed intermediate the ends and having adjustably clamped therein a stop block 26. Mounted on the bar 24 are fingers 27 and 28 are held in spaced relationship to each other and to the bar 24 by means of spacer blocks 29 and 30. Retaining means is provided by cap screws 31 extending through the fingers and spacer blocks and threaded into bar 24. The fingers 27 and 28 may be made of metal which, as reduced to practice, is about twenty-five-thousandths of an inch thick while the spacer block 29 is made of a thickness such that when assembly 22 is mounted the leads **32*a*, *b* and *c* extending from a transistor body 34 just slide between and outside the fingers 27 and 28. The extended portions 28*a* and 27*a* above of the fingers act as and provide a spaced guideway of determined length for the leads as that they are engaged by the fingers in a precise spaced relationship wherein the leads are controlled and guided through the chute in a three point engagement. It is to be further noted that the stop block 26 may be adjusted on the bar 24 so as to engage the top of the transistor 34, and determinedly confine the transistor between the block 26 and the guide edge 35 of the fingers 27 and 28. This adjustment of the block 26** accommodates various heights of transistor bodies.

Figure 3:
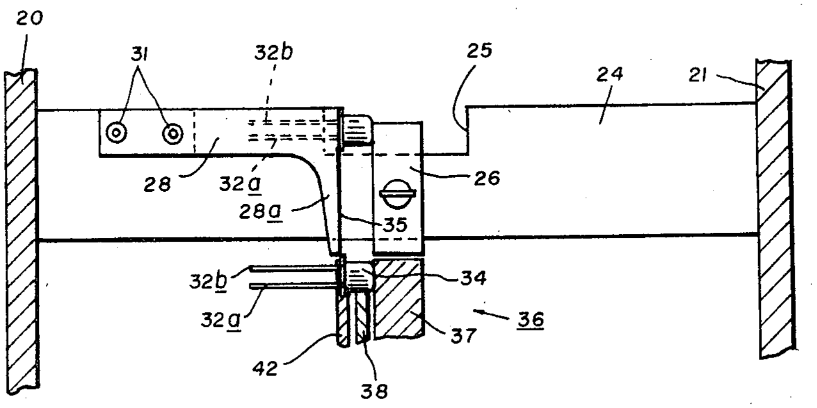
FIG. 3 represents a fragmentary plan view of the finger chute and looking in the direction of the arrows 3—3 of FIG. 2.

As seen in FIGS. 3 and 4 and 4A, the finger chute terminates at a transfer wheel means 36 which in the present instance includes a main disc 37 which acts as the stop member or guide for the top surface of the transistor body. Adjacent the main disc is a carrier disc 38 having a plurality of spaced cutouts 39 formed in its outer periphery. These cutouts 39 are formed so as to engage and retain the diameter of the transistor body 34, the cutouts preferably being equally spaced. These cutouts may be either rectangular or circular as desired as long as the walls retain the transistor. An outer or lead retaining disc 42 is adjacent and is spaced a small distance from the carrier disc 38. Formed in the lead disc 42 are cutouts 44 which in the preferred embodiment include outer cutouts **44*a* which are deeper than the center cutout 44*b*. These cutouts 44*a* and 44*b* are spaced so as to precisely receive and retain the leads of the transistor and in conjunction with the body cutout 39 in disc 38 precisely orient the transistor as it is fed by gravity from the chute 22 onto the transfer wheel 36 and into the pockets formed by the cutouts 39 and cutouts 44**.

In FIG. 4 it is seen that transfer wheel 36 which as reduced to practice has twelve pockets or stations into which the transistors are deposited and that the chute 22, as seen in FIG. 4, meets the transfer wheel at a position corresponding to one o'clock. At the next station to the left as indicated by the arrow, or as corresponding to the position of twelve o'clock there is a cutting mechanism generally designated 46 which is adapted to precisely cut the leads of the transistor. Three stations later or, as viewed, at nine o'clock there is a bending mechanism 48 by which means the cut leads may have portions of each lead bent and positioned in a precise manner. At a position corresponding to about six o'clock the transistor is allowed to fall out of the transfer wheel and to then fall a short distance to the floor of the apparatus or into a chute (not shown) leading from the apparatus to an accumulation bin.

Figure 9:
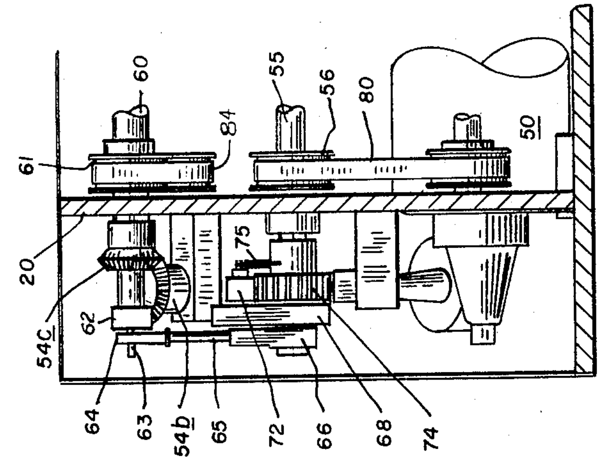
FIG. 9 represents a plan view of the drive mechanism of FIG. 8.
Figure 8:
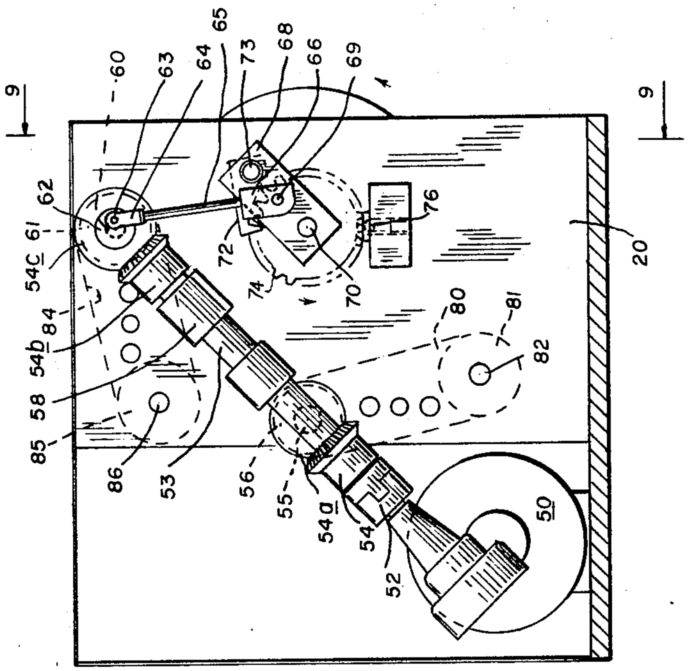
FIG. 8 represents a side view of a drive mechanism which may be used in the exemplified apparatus.

Referring now to FIGS. 8 and 9 there is illustrated a drive system which utilizes a crank arm in combination with a ratchet and pawl to advance the transfer wheel with an intermittent motion. This drive system includes a gear motor 50 of determined output speed and whose output shaft has mounted thereon a coupling 52 driving a shaft 53. A bevel gear 54 mounted on the shaft 53 engages and drives a like bevel gear **54*a* mounted on the end of shaft 55 which extends through the side wall 20. Mounted on the shaft 55 and to the right of the wall 20 as seen in FIG. 9 is a timing pulley 56. The upper portion of the shaft 53 is carried by and is rotatable in a bearing support 58 and on the outboard portion of this shaft 53 there is carried a bevel gear 54*b* of like size as gear 54. This gear 54*b* engages and drives a like bevel gear 54*c* carried by a shaft 60 which extends through the side wall 20. On this shaft 60 and to the right of the wall 20 as seen in FIG. 9 is a timing pulley 61 while on the left end of shaft 60 as viewed in FIG. 9 there is mounted an eccentric block 62 having a pin 63 which, as the shaft 60 is rotated, transcribes a determined circle. A rod end 64 of conventional design is pivotally mounted on pin 63 and carries a rod 65 which has its other end threaded into clevis end 66. End 66 is pivotally mounted to link 68 at pin 69. One end of link 68 is pivotally mounted on shaft 70 and the other end of link 68 pivotally carries a pawl 72 mounted on a stud 73. The end of the pawl 72 engages a gear 74 mounted on and driving the shaft 70. In the exemplified drive the gear 74 is a conventional twelve tooth spur gear. A tension spring 75 extends from the tip of the pawl 72 to a suitable mounting means extending from the wall 20 and provides means to urge the tip of the pawl into engagement with the gear. Opposite the pawl and disposed to engage the periphery of the toothed gear is a conventional ball detent 76 disposed so that when the spring loaded ball moves forwardly into engagement with the teeth of the gear it will precisely position the gear and shaft 70. The detent 76 also prevents any unwanted movement of shaft 70** during the return movement of the pawl wherein occurs the cutting and bending operations.

The timing pulleys 56 and 61 are parts of the drive for members doing the cutting and bending operations. Pulley 56 drives a timing belt 80 which engages and drives a pulley 81 mounted on shaft 82. In like manner pulley 61 carries and drives a timing belt 84 which engages and drives a pulley 85 mounted on shaft 86. The present embodiment contemplates that pulleys 56, 61, 81 and 85 are of like pitch and teeth and belts 80 and 84 are also alike.

As the gear motor 50 turns the shaft 53, the gears 54, **54*a*, 54*b* and 54*c* are caused to turn thereby rotating shafts 55 and 60 and through the timing belt to drive the shafts 82 and 86. As shaft 60 is rotated the eccentric motion of pin 63 causes the pawl 72 to engage the gear 74 and with a predetermined extent of movement to cause the shaft 70 to move one-twelfth of a revolution. It is to be noted that shaft 70 is the shaft which carries and rotates the transfer wheel 36**.

Figures 6, 7:
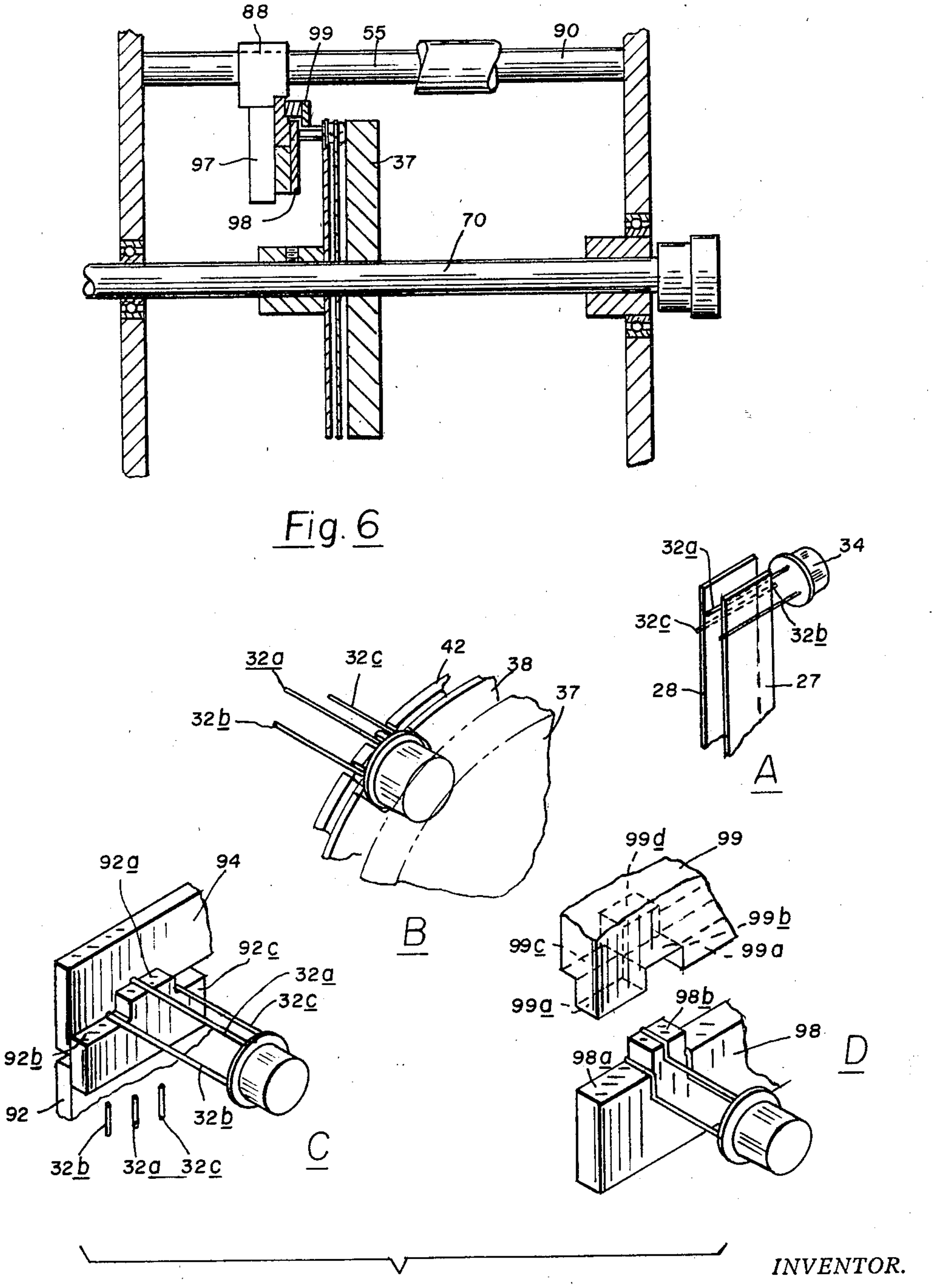
FIG. 6 represents a sectional view generally on the line 6—6 of FIG. 4 and with a portion of the cam shafts omitted and showing the lead bending mechanism.
FIG. 7 represents an exploded isometric and somewhat pictorial representation of the sequence of operation of the apparatus and the steps of the method so disclosed.

Referring now to FIGS. 4, 5 and 6, the shaft 70 as it is intermittently rotated advances the transfer wheel so as to carry the transistor to the cutting mechanism 46 which mechanism moves in synchronism with the wheel 36 by means of the drive means described above. The cutting mechanism includes a support block 88 carried on non-rotating shafts 89 and 90. A support bar 92 is pivotally carried by the block 88 and has its outer end slidably engaging shaft 86 which at this position has a portion removed to form an elliptical cam. A spring 93 urges the end of the support bar into engagement with shaft 86. A top bar 94 also pivotally carried by the block 88 has its one end engaging an eccentric cam portion 95 on the shaft 60. A spring 96 urges bar 94 into engagement with cam 95. In the operation of the apparatus the advance of the transport wheel 36 occupies about one half of the rotation of the shafts 60 and 86. During this transport motion time the shafts 60 and 86 are about opposite the position shown in FIG. 4 and bars 92 and 94 are at the outer extremes of movement permitted by the cam surfaces and as indicated by the phantom outline. With the ends of the bars apart the leads of the transistor can be brought in the way of cutting action which is performed when the two ends of the bars 92 and 94 are urged together by the rotation of the shafts 60 and 86 to the position shown in FIG. 4. In like manner the bending mechanism 48 is identical in operation to the cutting mechanism 46. Carried by a support block 97 is a lower support bar 98 similar to bar 92, and a top bar 99 similar to top bar 94. The bars 98 and 99 are moved by cam shafts 55 and 82 in the manner of shafts 60 and 86.

As seen in FIGS. 5 and 7C the support bar 92 has its cutting end formed with a raised center portion **92*a* at a predetermined distance above the normal cutting portion 92*b*. The upper bar 94 has correspondingly formed surfaces so that when the bars 92 and 94 are brought together and past each other they will cut simultaneously the leads 32*a*, *b* and *c*. It is to be particularly noted that in the preferred embodiment the cam portion of shaft 86 is arranged so that the lower bar 92 is cammed into position in sufficient time for the surfaces 92*a* and 92*b* to contact and slightly lift the leads 32*a*, *b* and *c* an amount great enough to support the leads prior to the cutting action provided by the movement of the top bar 94 approaching and passing by the lower bar 92. It is to be further noted that the cutting portion 92*c* outward from the lower bar 92 and is made only a little longer than the width of the leads 32*b* to 32*c* so that as the wheel is rotated in the direction of the arrows the cut leads will pass by arm 92**.

After cutting to a precise length the transistor and leads in the transfer wheel are moved to the bending station where the ends of the bars 98 and 99 are formed so as to bend and space the leads. As seen in FIG. 7D a die set is formed to provide offsets to each of the leads. A separate die set using a different die arrangement is required for each desired lead pattern and spacing. As in the cutting mechanism, the bending mechanism is timed by the cams to provide a support surface for the leads prior to bending. In FIG. 7D the upper surfaces **99*a* and 99*b* are moved downwardly to engage the leads and to hold then in alignment as the bending surfaces 98*a* and 98*b*** are brought upwardly to then engage and bend the leads. As to whether the top or the bottom bar is brought first to the leads to support them while bending is a matter of the final disposition of the leads as to bend and spacing. It is also important to remember in the bending of the leads that no strain on the lead is to be made at its entrance into the body as bending or strain at this point could cause failure or affect the operating characteristics of the transistor. Each bending arrangement requires a precise and particular die set but it is necessary to remember to support the leads before and as they are bent and since the cams have a large opening the dies are easily designed to provide the desired bending and spacing of the lead ends. If the offsets in the leads were to be opposite as shown, the dies would be reversed from the position shown.

Figure 2:
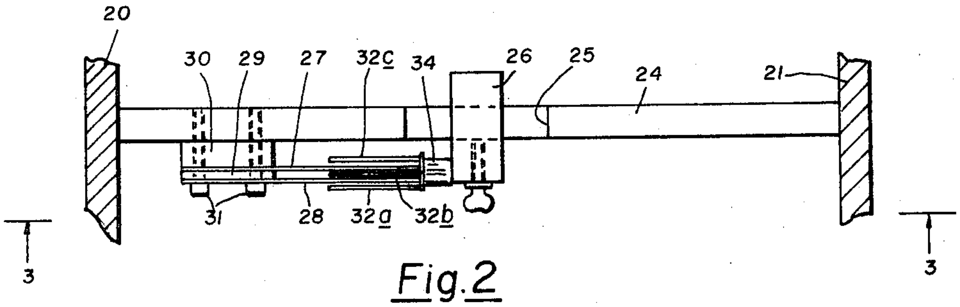
FIG. 2 represents a fragmentary enlarged front view looking in the direction of the arrows 2—2 as seen in FIG. 1 and showing the finger chute providing means for precisely orienting the transistors.

The above described apparatus, as it has been reduced to practice, is also provided with certain adjustments providing for different heights of transistors and lengths of leads. Adjustability in this invention makes the apparatus highly useful and versatile. As for example, stop block 26 as seen in FIGS. 2 and 3 is adjustable so as to adjustable so as to accommodate differing heights of transistors. In like manner main disc 37 is adjustable by means of screw 100 carried in bearing block 101 and manipulated by knob 102. Cutting mechanism 46 and bending mechanism 48 are each movable by means of screws 104 and 105 threadedly mounted in the blocks 88 and 97. By rotation of the proper screws the cutting mechanism and/or the bending mechanism can be moved on their support shafts so as to precisely cut and bend the leads as desired.

Referring now to FIG. 10 there is shown a pair of testing dies 110 and 112 which may be mounted on bars 98 and 99 in place of the bending dies shown in FIG. 7D. These dies are adapted to engage the leads of the transistor and to test the transistor in the manner to be described hereafter. The lower testing die 112 is preferably made of a non-conducting material such as phenolic or the like. The three upper surfaces have separate conductors and attached leads such as copper which are attached as by molding to the die. The upper left conducting surface 114 is formed or connected to a conducting lead 115 extending downwardly to a terminal hole 116 adapted for connection to a testing means not shown. The intermediate portion of die 112 has the upper conducting surface 117 formed or connected to a conducting lead 118 extending downwardly to a terminal hole 119. The right upper conducting surface 120 is formed or connected to a conducting lead 121 which extends downwardly to a terminal hole 122. Attaching holes 123 are disposed so as to engage or retain a bolt or screw not shown by which the die 112 may be mounted on an arm not shown.

The upper die 110 has its lower edge formed with steps to precisely mate with the upper conducting surfaces of die 112. This upper die is also of non-conducting material and in the present embodiment is of nylon which in itself has a small amount of resilience. Attaching holes 124 are disposed so as to engage or retain a bolt or screw by which the die 110 may be mounted on an arm.

It is to be noted that if desired as an additional step in the processing of the transistor 34 it is desired to test the transistor an additional mechanism is provided which may be like the cutting and bending mechanism 46 and 48. Transfer wheel 36 may be increased from twelve to sixteen or eighteen stations with a corresponding change in the drive. This increase in stations or an increase in the size of the wheel allows an additional mechanism to be mounted between the sides 20 and 21 and drive means from the drive train described above. The operation will be described below.

*Use and operation*

The above described apparatus, as reduced to practice, is intended to be hand-fed at rates of two to three thousand pieces per hour. The operator grasps a transistor and with the intermediate lead 32*a* towards her or him, places the outer leads 32*b* and *c* outside fingers 27 and 28 and the intermediate lead 32*a* between fingers 27 and 28. The transistor is then released and by gravity drops toward the transfer wheel 36. When the transistor reaches the wheel and if an empty pocket is available, the body of the transistor drops into this pocket and is retained therein by main disc 37, cutout 39 and lead disc 42, the transistor being held as tightly as the manufacturing tolerances of the transistors permit. Cutouts 44*a*, *b* and *c* prevent any rotation of the transistor and insure that in the cutting and bending operations the leads will be in a precise position. After rotation from the receiving position at eleven o'clock to the position of twelve o'clock the cutting motion is begun. As the shaft 86 turns to bring the outer circular portion into engagement with the end of bar 92 the surfaces 92*a* and 92*b* move upwardly to engage and support the leads 32*a*, *b* and *c*. At the same time the eccentric 95 is moving the top bar 94 and its cutting edge toward and past the bar 92 so as to cut the leads. The bars 94 and 92 are then moved once again to the open position at which time the indexing of the transport wheel is made and continues until the transistor is brought to the bending operation whereupon the upper bar 99 moves inwardly to support the leads while the lower bar 98 engages the leads and bends the leads to the desired form. The bars 98 and 99 are then moved to the open position and the transport wheel is then indexed with the processed transistor finally being discharged by gravity.

When it is desired to use the apparatus as a test unit either alone or in conjunction with cutting and/or bending apparatus the dies of FIG. 10 are mounted on arms adapted to be moved toward and away from each other. The lower or supporting die 112 is caused to be moved toward the leads so as to engage and support the leads 32*a*, *b* and *c* after which the upper or pressing die 110 is brought down to a point where the die engages, presses and holds the leads in firm contact with the separate conducting surfaces 114, 117 and 120. Thru leads or conductors attached to the terminals 116, 119 and 122 and extending to test apparatus of conventional design, not shown, the various desired tests of the transistor may be made. These tests may include tests for a short circuit, resistance values and/or many other desired results. A receiving system adapted to receive and classify the transistors in response to one or more of the results of the test can be placed below the transport system and is not shown as it may be of any conventional design adapted to the particular selection of tests.

It is to be further noted that transistors may be fed by hand to the transport wheel 36 without using the finger chute 22. It is also contemplated that mechanical loading devices may be used with each device holding perhaps as many as one to two hundred oriented transistors. The use of these loading devices for high speed feeding of transistors to the transfer wheel permits the apparatus to process five to eight thousand and perhaps more transistors per hour.

*Method*

In addition to the novel apparatus described above it is to be noted that the method of orienting, cutting and bending the leads of a transistor as disclosed in this invention provide a novel process for trimming and shaping transistor leads at speeds of more than one to four thousand units per hour.

As shown in FIG. 7A through 7D the steps include:

*Orienting* and *placing* the transistor leads 32*a*, *b* and *c* between and outside the guide fingers 27 and 28;

*Releasing* the transistor so that it may be fed in the chute to a transport means;

*Indexing* and *bringing* a pocket in the transport means in the way of the feed-chute. so as to receive and retain a precisely oriented transistor in the pocket of the transport means;

*Transferring* the transistor to the pocket of the transport means;

*Rotating* the transport means so as to bring the leads of the transistor in the way of the cutting means;

*Lifting* and *supporting* the leads of the transistor while a cutting means cuts the leads of a transistor to a precise length;

*Cutting* the leads;

*Releasing* the leads and *advancing* the transport means so as to move the cut leads of the transistor to a bending means;

*Bending* the leads;

*Lifting* and *supporting* the leads of the transistor while a bending means engages and bends determined portions of the leads to a desired configuration and spacing;

*Lifting* and *supporting* the leads of a transistor while a set of testing dies engage the leads;

*Testing* the transistor by passing through the contacted leads one or more charges of electrical current, transistor and evaluating apparatus;

*Releasing* and *advancing* the transport means so as to move the processed transistor to a discharge position; and

*Discharging* the processed transistor to an accumulator.

Since certain changes may be made in the above construction and in the above process and different embodiments of the invention can be made without departing from the scope thereof, it is intended that all matters contained in the above disclosure or shown in the accompanying drawings be interpreted as illustrative and not in a limiting sense.

What is claimed is:

1. Apparatus for orienting, feeding and cutting the leads on components such as transistors and the like, said components being characterized in that at least a plurality of wire-like leads extend from one end thereof, the apparatus comprising: (1) a finger chute adapted to receive and transfer a transistor and its leads to a predetermined discharge position and in a precisely oriented position; (2) a transfer means having receiving and retaining pockets formed therein and disposed in a determined relationship to the finger chute; (3) means for advancing the transfer means so as to bring a pocket in the way of the discharge portion of the chute so that the transistor is moved into the pocket; (4) a cutting mechanism moving in synchronism with the movement of the transfer means and adapted to support and cut the leads at a determined distance from the transfer means; and (5) means for discharging the transistor from the transfer means.

2. Apparatus as in claim 1 in which the transfer means is a transfer wheel having a multiplicity of pockets equally spaced in a circular relationship and with each pocket having a cover portion with precisely oriented and spaced wire lead receiving means.

3. Apparatus as in claim 2 in which the cutting mechanism includes a support bar and a top bar each movable toward and away from each other in response to a cam means, the support bar movable toward and to the wire leads so as to support the leads at a predetermined location in respect to the wire lead receiving means of the pocket cover, the top bar movable toward the support bar, and in response to said cam means, the top bar is moved to and past the support bar so as to cut the leads.

4. Apparatus as in claim 3 in which the support bar is formed with wire lead support surfaces of differing heights and with the top bar formed with wire lead cutting surfaces of differing heights, the heights being formed so that they are substantially parallel at the time the wire leads are starting to be cut.

5. Apparatus for orienting, feeding and bending the leads on components such as transistors and the like, said components being characterized in that at least a plurality of wirelike leads extend from one end thereof, the apparatus comprising: (1) a finger chute adapted to receive and transfer a transistor and its leads to a predetermined discharge position and in a precisely oriented position; (2) a transfer means having receiving and retaining pockets formed therein and disposed in a determined relationship to the finger chute; (3) means for advancing the transfer means so as to bring a pocket in the way of the discharge portion of the chute so that the transistor is moved into the pocket and in an oriented position; (4) a bending and spacing mechanism moving in synchronism with the movement of the transfer means and adapted to support the leads and then bend the leads at a determined distance from the transfer means; and (5) means for discharging the transistor from the transfer means.

6. Appaartus as in clami 5 in which the bending and spacing mechanism includes a support bar and a top bar each movable toward and away from each other in response to a cam means, one of the bars movable toward and to the wire leads so as to support the leads at a predetermined location in respect to the wire lead receiving means of the pocket cover, a die form provided on both the support bar and the top bar and disposed to cooperatively engage the wire and as the support and top bars are brought toward each other, the die forms adapted to engage, bend and space the leads in a precise and predetermined manner.

7. Apparatus as in claim 6 in which the die forms in the support bar and top bar are of differing heights and being formed and spaced so that as they are brought into engagement with the wire leads the forms have portions substantially parallel to each other.

8. Apparatus for orienting, cutting, bending and spacing the leads on components such as transistors and the like, said components being characterized in that at least a plurality of wire-like leads extend from one end thereof, the apparatus comprising: (1) a finger chute adapted to receive and transfer a transistor and its leads to a predetermined discharge position and in a precisely oriented position; (2) a transfer means having receiving and retaining pockets formed therein and disposed in a determined relationship to the finger chute; (3) means for advancing the transfer means so as to bring a pocket in the way of the discharge portion of the chute so that the transistor is moved into the pocket; (4) a cutting mechanism moving in synchronism with the movement of the transfer means and adapted to support and cut the leads at a determined distance from the transfer means; (5) a bending mechanism moving in synchronism with the movement of the transfer means and adapted to support and bend the leads at a determined distance from the transfer means; and (6) means for discharging the transistor from the transfer means.

9. Apparatus as in claim 8 in which the transfer means is a transfer wheel having a multiplicity of pockets equally spaced in a circular relationship and with each pocket having a cover portion with precisely oriented and spaced wire lead receiving means.

10. Apparatus as in claim 1 in which the finger chute includes at least two fingers of relatively thin sheet material and spaced so that one of the leads may just slide between the facing surfaces of the adjacent fingers, and with two of the fingers having their outer surfaces spaced so as to slidably engage and guide the facing surfaces of two of the outer wire leads of the transistor.

11. Apparatus as in claim 10 in which the finger chute includes a movable stop block adapted to engage the top surface of the transistor body and in which the fingers have a guide edge adapted to engage the bottom surface of the transistor body and adapted to engage and guide the transistor body as it is slid through the finger chute.

12. Apparatus as in claim 2 in which the transfer wheel has a main disc portion having a one face adapted to engage the top of the transistor body, an intermediate carrier disc adjacent to the main disc portion and movable with hte main disc portion, the carrier disc having cutouts equally spaced and sized so as to receive and retain the outer conformation of a transistor body, and a lead disc adjacent the carrier disc, the lead disc having wire lead cutouts arranged in groups in precise relationship to the cutouts in the carrier disc; the wire lead cutouts being formed to support the outer leads in one plane and the intermediate lead in another plane.

13. Apparatus as in claim 8 in which the finger chute includes at least two fingers of relatively thin sheet material and spaced so that one of the leads may just slide between the facing surfaces of adjacent fingers and with two of the fingers having their outer surfaces spaced so as to slidably engage and guide the facing surfaces of two of the outer wire leads of the transistor, the chute further having a stop block adapted to engage the top edge of the transistor body and the fingers having a guide edge adapted to engage the bottom surface of the transistor body, and in which the transfer wheel includes a main disc portion having a one face adapted to engage the top of the transistor body, an intermediate carrier disc adjacent to the main disc portion and movable with the main disc portion, the carrier disc having cutouts equally spaced and sized so as to receive and retain the outer conformation of a transistor body, and a lead disc adjacent the carrier disc, the lead disc having wire lead cutouts arranged in groups in precise relationship to the cutouts in the carrier disc, the wire lead cutouts being formed to support the outer leads of the transistor in one plane and the intermediate lead in another plane, and in which the cutting mechanism and bending mechanism each include a support bar and a top bar each movable toward and away from each other in response to a cam means, one of the bars movable toward and to the wire leads so as to support the leads at a predetermined location in respect to the wire lead receiving cutouts of the lead disc, the top bar movable toward the support bar and in response to the cam means, the top bar in the cutting mechanism movable to and past the support bar and in the bending mechanism a die form is provided on both the support bar and the top bar and is disposed to cooperatively engage the wire leads and as the support and top bars are brought toward each other, the die forms engage, bend and space the leads in a precise manner.

14. The method of orienting, feeding and cutting the leads of a transistor and the like and characterized by having a plurality of leads extending from one end thereof, the method including the steps of:

arranging the transistors in a side-by-side arrangement and with the ends having the plurality of leads extending therefrom being positioned to extend in the same direction;

orienting and placing the leads of a transistor between and outside of a pair of spaced guide fingers forming a guide chute;

releasing the transistor so that it may be fed and stored in the chute;

indexing and bringing a pocket in a transport means in the way of the discharge end of the guide chute;

transferring from the chute a transistor into a pocket of the transport means;

moving the transport means to bring the leads of the transistor in the way of the cutting means;

cutting the leads of a transistor to a precise length;

releasing the leads from the cutting means;

advancing the transport means to carry the transistor from the cutting means; and discharging the transistor from the transport means.

15. The method of claim 14 in which there is further included the steps of:

*intermittently rotating* the transport means; and

*lifting* and *supporting* the leads of the transistor as the leads are cut to a precise length.

16. The method of orienting, feeding and blending the leads of a transistor and the like having leads extending from one side thereof, the method including the steps of:

*orienting* and *placing* the leads of a transistor between and outside a pair of spaced guide fingers forming a guide chute;

*releasing* the transistor so that it may be fed and stored in the chute;

*indexing* and *bringing* a pocket in a transport means in the way of the discharge end of the guide chute;

*transferring* from the chute a transistor into a pocket of the transport means;

*advancing* the transport means so as to move the transistor and leads to a bending means;

*bending* determined portions of the leads of a transistor to a desired configuration and spacing;

*releasing* the leads from the bending means;

*advancing* the transport means to carry the transistor from the bending means; and

*discharging* the transistor from the transport means.

17. The method of claim 16 in which there is further included the steps of:

*intermittently rotating* the transport means;

*lifing* and *supporting* the leads of the transistor while the ends of the leads are bent to a desired configuration and spacing.

18. The method of claim 17 in which there is further included the cutting of the leads and including the steps of:

*moving* the transport means to bring the leads of the transistor in the way of the cutting means;

*lifting* and *supporting* the leads of the transistor;

*cutting* the leads of the transistor to a precise length; and

*releasing* the leads after cutting so that the transistor may be advanced to the bending and further operations.

19. Apparatus for orienting, cutting, bending and spacing the leads on components such as transistors and the like, said components being characterized in that at least a plurality of wire-like leads extend from one end thereof, the apparatus comprising: (1) means for orienting and feeding transistors in a precisely oriented position; (2) a transfer means having receiving and retaining pockets formed therein and disposed in relation to the feeding means; (3) means for advancing the transfer means so as to bring the transistors to selected precise locations for determined lengths of time; (4) a cutting mechanism moving in timed relationship to the transfer means so as to support and cut the leads at a determined distance from the base of the transistor; (5) a bending mechanism moving in timed relationship to the transfer means and adapted to support and bend the leads at a determined distance from the base of the transistor; (6) means for discharging the transistor from the transfer means.

20. Appaartus as in claim 19 in which the cutting mechanism includes a support bar and a top bar each movable toward and away from each other in response to a cam means, the support bar movable toward and to the wire leads so as to support the leads at a predetermined location in respect to the wire lead orienting means, the top bar movable toward the support bar and in response to said cam means the top bar is moved to and past the support bar so as to cut the leads; and in which the bending and spacing mechanism includes a support bar and a top bar each movable toward and away from each other in response to a cam means one of the bars movable toward and to the wire leads so as to support the leads at a predetermined location in respect to the wire lead orienting means, a die form provided on both the support bar and the top bar and disposed to cooperatively engage the wire and as the support and top bars are brought toward each other the die forms engage, bend and space the leads in a precise and predetermined manner.

21. Apparatus for orienting, transporting and engaging the leads on components such as transistors and the like, said components being characterized in that at least a plurality of wire-like leads extend from one end thereof, the apparatus comprising: (1) means for orienting and feeding transistors in a precisely oriented position; (2) transfer means having receiving and retaining pockets formed therein and disposed in relation to the feeding means so as to receive and retain the transistor and leads in a precise selected position; (3) means for advancing the transfer means so as to bring the transistors to selected precise locations for determined lengths of time; (4) a test mechanism having a pair of electrical test dies carried by means movable in timed relationship to the transfer means so as to support and grip the leads while selected electrical tests of the transistor are made; and (5) means for discharging the transistor from the transfer means.

22. Apparatus as in claim 21 in which the test mechanism and the means movable includes a support bar and a top bar each movable toward and away from each other in response to a cam means, the support bar carrying a first test die half having one face formed to engage the transistor leads extending from the transfer means and in the same orientation as they are disposed in the transfer means, this face having separate conductive members disposed thereon and adapted to support these transistor leads when this die half is moved into support position; means extending from each conductive member whereby electrical signals may be sent and received from each conductive member; and the top bar carrying a second test die half having one face formed to mate with the first die half this face having a non-conductive surface and adapted to engage and urge the leads into current-carrying contact with the first die half.

23. Apparatus as in claim 22 in which the apparatus includes a cutting mechanism moving in timed relationship to the transfer means and adapted to support and cut the leads at a determined distance from the base of the transistor.

24. Apparatus as in claim 22 in which the apparatus includes a bending mechanism moving in timed relationship to the transfer means and adapted to support and bend the leads at a determined distance from the base of the transistor.

References Cited

UNITED STATES PATENTS

| | | | |
|---|---|---|---|
| 3,071,166 | 1/1963 | Gutbier | 140—1 |
| 3,075,562 | 1/1963 | Jankowski | 140—1 |
| 3,094,212 | 6/1963 | Moore et al. | 209—75 |
| 3,144,889 | 8/1964 | Cole | 140—140 |

FOREIGN PATENTS

| | | |
|---|---|---|
| 549,379 | 11/1957 | Canada. |

CHARLES W. LANHAM, *Primary Examiner.*

L. A. LARSON, *Assistant Examiner.*